United States Patent [19]

Steidinger

[11] 4,353,328
[45] Oct. 12, 1982

[54] METHOD AND APPARATUS FOR CONSTRUCTING A SYSTEM OF GUTTERS FOR A SWINE BUILDING

[75] Inventor: Ronald L. Steidinger, Forrest, Ill.

[73] Assignee: Forrest Redi-Mix Co., Forrest, Ill.

[21] Appl. No.: 157,198

[22] Filed: Jun. 6, 1980

[51] Int. Cl.³ .............................................. A01K 1/01
[52] U.S. Cl. ...................................... 119/20; 119/28
[58] Field of Search ............................. 119/16, 20, 28

[56] References Cited

U.S. PATENT DOCUMENTS

| | | | |
|---|---|---|---|
| 3,224,414 | 12/1965 | Conover | 119/28 |
| 3,584,603 | 6/1971 | Rutherford | 119/28 X |
| 4,175,515 | 11/1979 | Bradley | 119/16 |
| 4,183,324 | 1/1980 | Nobbe | 119/28 X |
| 4,217,859 | 8/1980 | Herring | 119/28 X |

FOREIGN PATENT DOCUMENTS 2814007 10/1979 Fed. Rep. of Germany ........ 119/28

OTHER PUBLICATIONS

"Gravity Drain Eliminates Need to Flush, Fuss," by Switzky, Debra, *National Hog Farmer,* Apr. 15, 1979, pp. 48-51.

*Primary Examiner*—Gene Mancene
*Assistant Examiner*—Robert P. Swiatek
*Attorney, Agent, or Firm*—Hill, Van Santen, Steadman, Chiara & Simpson

[57] ABSTRACT

A system of flush gutters for a swine building and method for their construction is provided comprising gutter modules and walkway modules made of concrete precast in inverted mold forms to provide surfaces essentially free from roughness and of a uniform smoothness. The walkways can be heated at predetermined locations.

7 Claims, 14 Drawing Figures

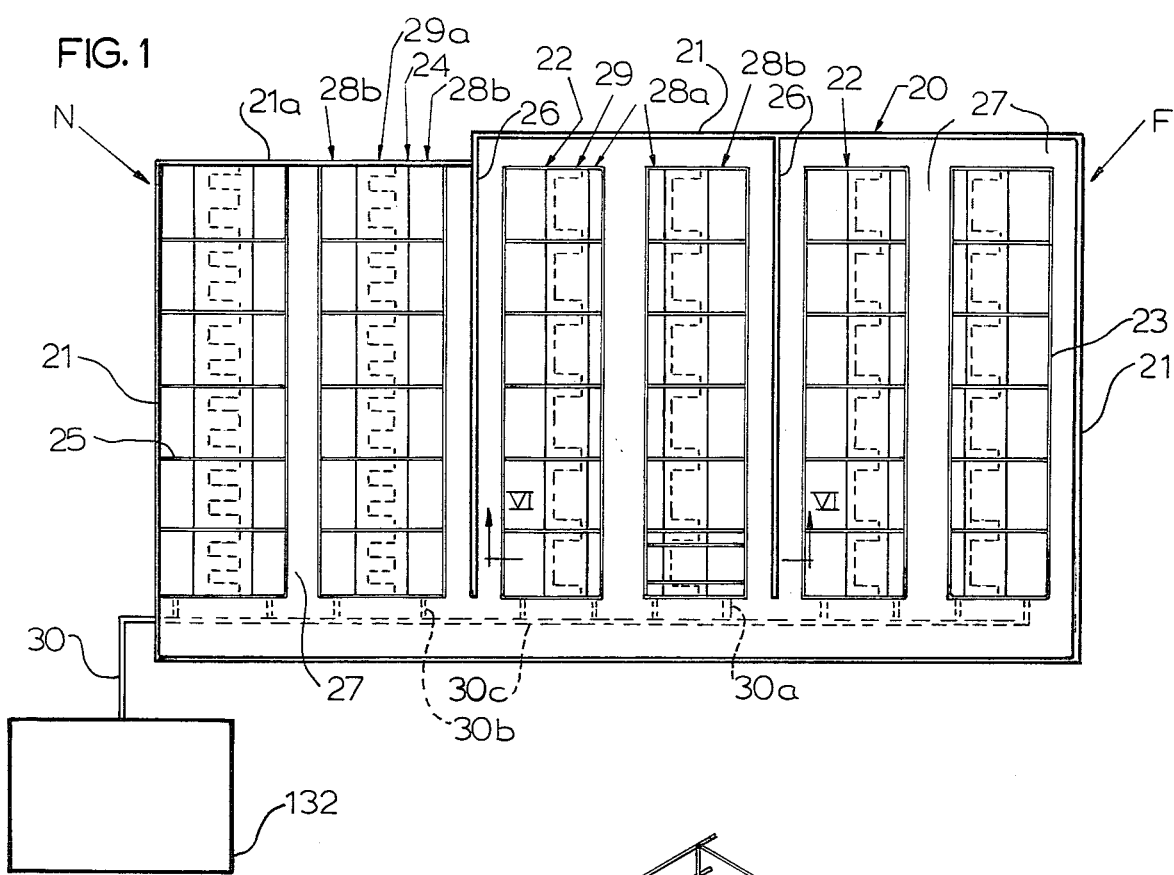
FIG. 1
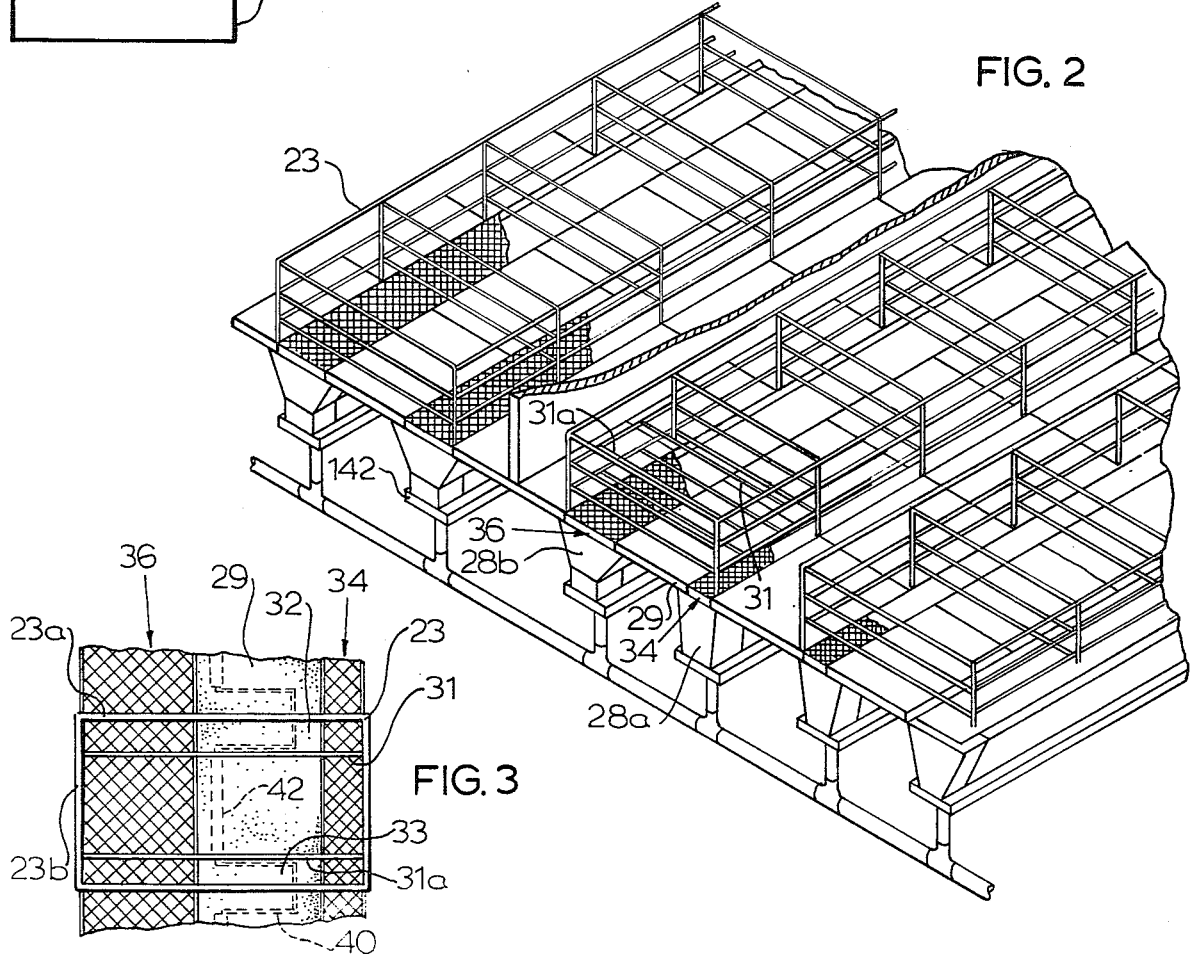
FIG. 2
FIG. 3

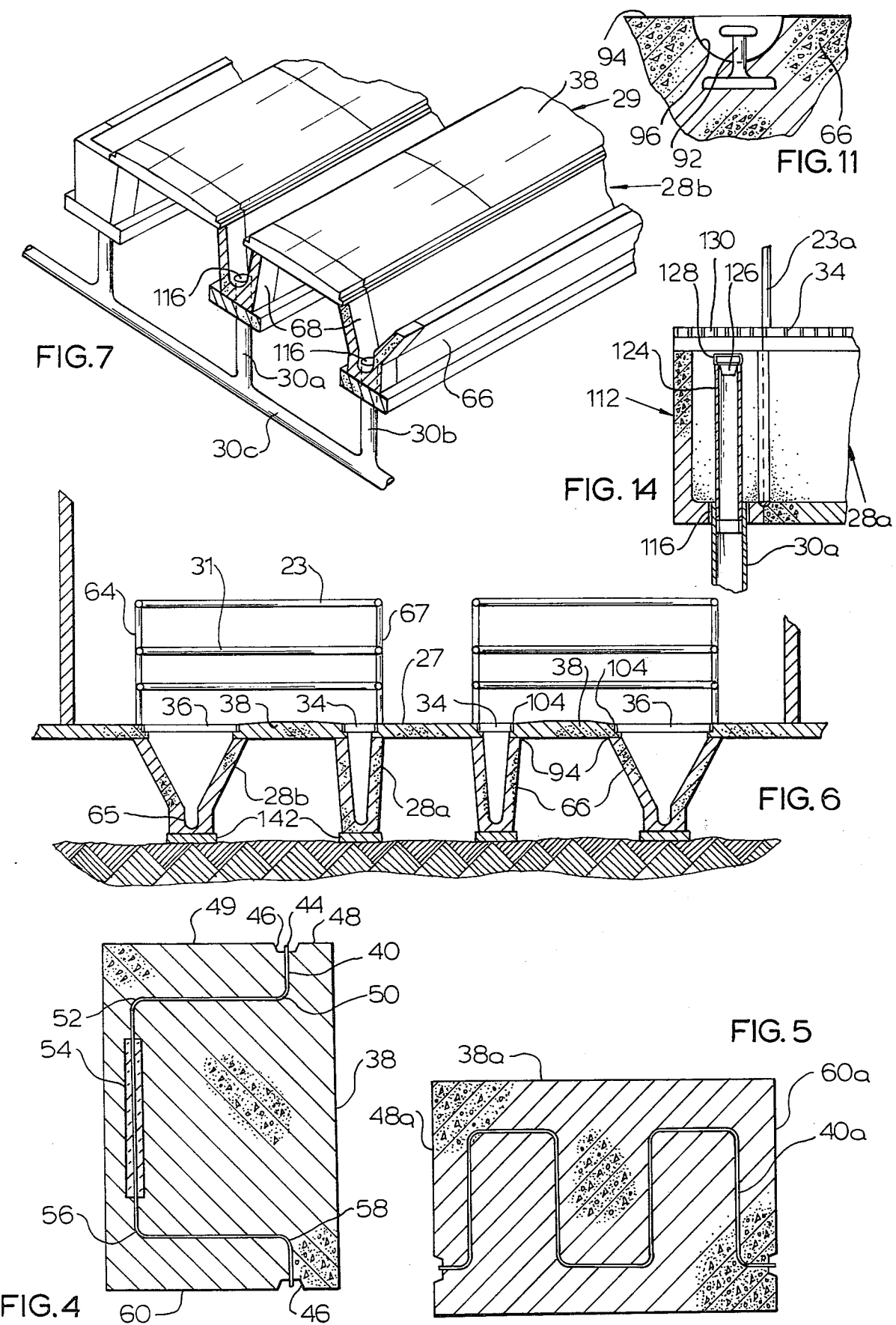

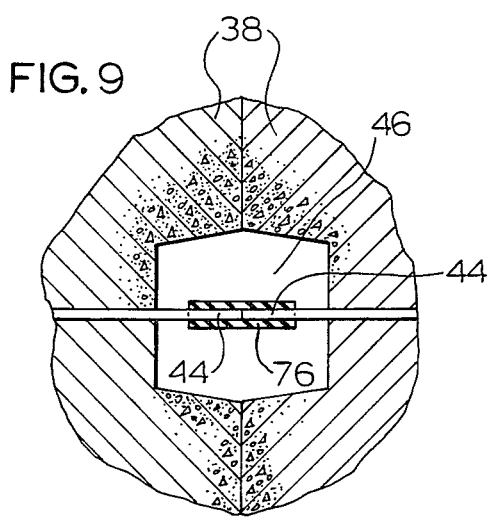
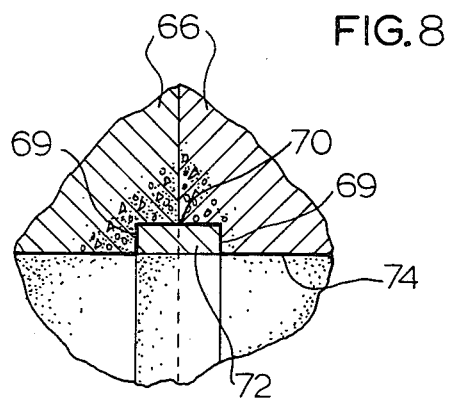
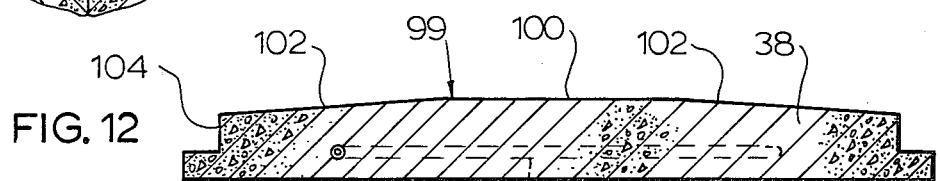
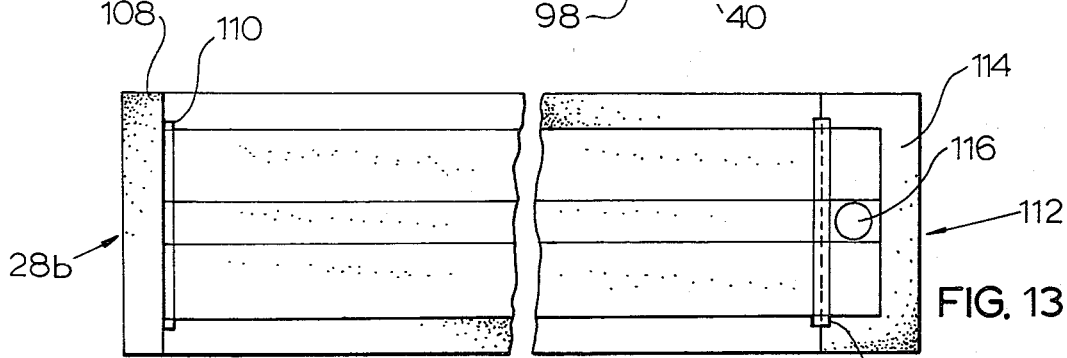
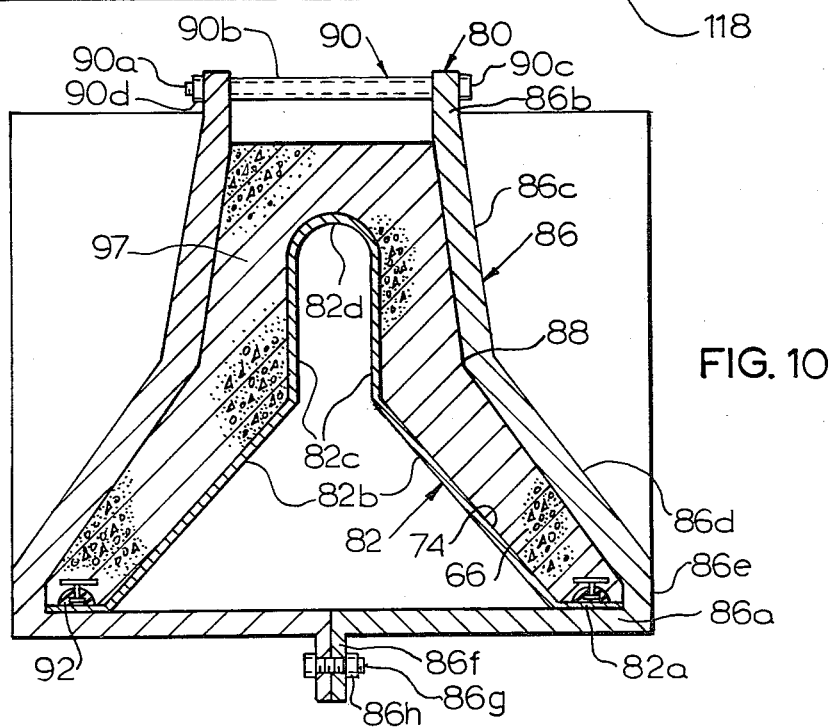

METHOD AND APPARATUS FOR CONSTRUCTING A SYSTEM OF GUTTERS FOR A SWINE BUILDING

BACKGROUND OF THE INVENTION

1. Field of the Invention

This invention relates to farm buildings and more specifically to a system of flush gutters for a swine building.

2. Description of the Prior Art

Swine buildings have long been equipped with a means for collecting wastes. The oldest and most prevalent means is simply a large pit underneath the floor of the swine building in which the wastes accumulate until their removal by the farm personnel either manually or by mechanical means. More recently, a system of gutters has been provided to channel the wastes to a central location for processing or use as fertilizer.

A recent development in gutter systems is described in the Apr. 15, 1979 issue of *National Hog Farmer*, pages 48–51.

The gutter systems commercially available embodying this recent development have either been of a plastic or fiberglas type material or have consisted of concrete gutters poured in place within the enclosure formed by the foundation walls of the swine building. The plastic or fiberglas gutters require a great deal of labor for their construction and have a guestionable life span due to the corrosive nature of wastes to be carried in the gutters. Additionally, the plastic or fiberglas gutters require metallic or other heavy and strong supports and require the area around the gutters to be back-filled with dirt for further support, thereby increasing the cost and time involved in installing the gutter system.

The concrete gutters which are poured in place require trenches to be dug for the placement of forms or at least extensive forms since a whole gutter row having a length of thirty to fifty feet must be poured at one time. Because of the labor, time and expense involved with each of these forms, usually only one row is poured at a time, requiring at least twenty-four hours between gutter rows, depending on the weather. Thus, construction of these concrete gutter systems can take a couple of weeks since more than a dozen gutters may be required in each building. Although these gutters can withstand the caustic nature of the wastes involved, since the gutters are poured in an upright position, the upper surface of the gutter is rough due to settling causing surface imperfections which form during the process of pouring concrete and allowing it to set. These surface imperfections cause waste material to accumulate on the side walls of the gutters, interfering with the collection of the waste and require periodic cleaning by farm personnel.

Prior attempts at solving the problem of surface imperfections have included providing a plastic or fiberglas liner on the interior sloped walls of the gutters retained either by glue, screws or bolts. Even these fastening methods develop problems and the covering sheets come loose. Another proposed solution is to use a manure-resistant paint on the concrete to give it a slippery feel. The added expenses involved in each of these methods plus the increased labor required makes these solutions undesirable.

SUMMARY OF THE INVENTION

The present invention provides for concrete gutters which are precast in sections which can be easily transported and placed into position at the desired location in a short period of time and with a minimum use of labor. Further, the gutters are cast so as to provide for smooth interior walls essentially free from surface imperfections, and constitute standardized modules which can be stock piled and furnished on demand.

In accordance with the principles of the present invention, the area within the foundation walls of the swine building is excavated to a depth sufficient to allow the tops of the gutter sections to be slightly below ground level. Separate trenches for each gutter row are now required. In this regard, the invention can be utilized in the beginning stages of a new construction of a swine building, or in the remodeling of an existing structure.

After excavation, concrete footings are poured in rows across the width of the building in a predetermined spaced relation to accommodate the rows of the gutter sections. The footings may be poured to have a slight slope toward one wall of the building, or if the building is more than about fifty feet wide, the footings can slope in two directions toward opposite walls.

After the footings have set, the gutter sections or modules can be moved into place. The gutter sections are transported to the location by truck and are moved by crane to the desired locations on the footings. The gutter sections or modules are abutted end to end to form rows of integrated modules of any selected length on the footings. A waterproof adhesive is applied to the ends of each gutter section to seal the gutter sections or modules together in a fluid impermeable manner and as an integrated sub assembly of any desired selected size.

A preformed drain assembly is provided for the lower end of each gutter section row with a removable plug therein. The drain assembly is connected to a horizontal waste pipe which was put in place prior to pouring the footings and which, in turn, is connected to a central collection point.

If only one end of each gutter section row has a drain assembly, the other end is provided with a cap.

During the precasting of the gutter sections or modules, the units are poured into steel molds such that the sections or modules are in an inverted position. The use of a steel mold and an inverted position insure that the interior surface of the gutter sections will be essentially free from surface imperfections caused by settling or surface roughness from other types of mold materials. This uniform, smooth surface, in combination with the dimensions of the gutter walls and the slope of the gutters allows the gutters to be self-flushing, that is, when the plug is removed from the drain assembly after the waste has accumulated to a predetermined depth in the gutters, the waste will flow out through the waste discharge pipe without the need for additional flushing with water or pumping means.

After the gutter sections are placed in sealed rows, precast floor sections are set on the top walls of two adjacent gutter rows. These floor sections are abutted end to end to form walkways above adjacent gutter rows. The top surface of the floor sections is contemplated as being at ground level. Heating means such as plastic piping can be incorporated in these floor sections to provide a heated area within the swine building.

The floor sections are also precast in a steel mold in an inverted position so that a uniformly smooth floor is provided. Lifting means such as lifting pins are provided in the gutter sections and the floor sections to allow for easy transportation and assembly of the sections.

The area between the gutter sections and below the floor sections is left unfilled as the gutters act as support bearing members. These open areas provide access to the drain assemblies or other parts of the gutter system, if required. Further, this large volume of air provides an insulation layer for the building, and especially provides a potential source of cool air for the swine in hot weather.

Thus, the present invention provides for a system of gutters for swine house which can be assembled in a short period of time with a minimum amount of labor and materials required. The gutters are long-lasting, provide a load bearing support for the interior construction of the swine building and are of a uniform smoothness essentially free from surface imperfections, thus allowing the gutters to be self-flushing and obviating the need for farm personnel to wash the gutters out from time-to-time.

DESCRIPTION OF THE DRAWINGS

FIG. 1 is a schematic top view of the interior of a farrowing nursery combination swine building.

FIG. 2 is a perspective view of the interior of the swine building shown in FIG. 1.

FIG. 3 is a top elevational view of a farrowing pen shown in FIG. 2.

FIG. 4 is a top sectional view of a walkway area showing a heating conduit.

FIG. 5 is a top sectional view showing an alternative method of heating a walkway section by means of a conduit.

FIG. 6 is a partial sectional view of the interior of the swine building and gutters taken along lines VI—VI of FIG. 1.

FIG. 7 is a perspective view partially cut-away showing the gutter sections embodying the present invention.

FIG. 8 is a partial view of two abutted gutter sections sealed together.

FIG. 9 is a partial view of two abutted walkway sections showing a conduit coupling.

FIG. 10 is a sectional view of the form used in precasting the gutter sections.

FIG. 11 is a partial view of a gutter section or walkway section showing a lifting pin.

FIG. 12 is a side sectional view of a walkway section shown in FIGS. 4 and 5.

FIG. 13 is a top elevational view of a gutter section row showing the drain end and the capped end.

FIG. 14 is a side sectional view of the drain shown in FIG. 7.

DESCRIPTION OF THE PREFERRED EMBODIMENTS

FIG. 1 is a schematic top view of the interior of a farrowing and nursery combination swine building 20 having exterior foundation walls 21 completely enclosing the building on its four sides.

A nursery area is shown at N and a farrowing section is shown at F, the nursery section N being bounded at one side by the wall portion 21a.

Within the exterior walls 21 are a plurality of rows 22 each containing a plurality of farrowing crates 23 within the farrowing section F and a plurality of rows 24 each containing a plurality of nursery crates 25 within the nursery section N. An interior wall 26 separates every two rows 22, 24 of crates 23, 25. A walkway 27 is provided between the rows 22, 24 of crates 23, 25 and adjacent the interior walls 26 and exterior walls 21. A first relatively narrow waste gutter row 28a is provided at each side of the rows 22 of the crates 23 adjacent the central walkway 27 disposed between the rows of crates 23. A relatively wide waste gutter row 28b is on the opposite side of a pig support surface 29 in the farrowing section F and on both sides of the support surface 29 in the nursery section N. A waste collection system 30 having a drain conduit 30a connected to each waste gutter 28a and a drain conduit 30b connected to each waste gutter 28b directs waste into a main drain conduit 30c for the removal, collection and storage of wastes from the gutter rows 28a, 28b.

It is contemplated that the waste gutter 28a will be disposed at the head end of the crates to receive left over or spilled food. The waste gutter 28b will be at the opposite end and receives excrement.

A partial perspective view of the interior of the swine building is shown in FIG. 2.

Each of the farrowing crates 23 is comprised of a separate interior enclosure crate 31 as best seen in FIG. 3 for retaining a single sow. In order to provide space on either side of the interior crate 31 as at 32 and 33 for young pigs or piglets, partitions are spaced inwardly to confine the sow. More specifically, each crate 23 has a generally rectangular configuration prescribed by a cage-like series of longitudinal bars and cross bars 23a and 23b. The confinement panels are shown at 31a and may conveniently comprise rods or tubes made of stainless steel of sufficient strength to function as fencing. Slotted or screened drainage coverings 34 and 36 are provided on either side of the central pig support surface 29 and cover the waste gutters 28a, 28b. A heating conduit 40 is contained within the sow support surface 29 and provides heat for areas 32 and 33 while being insulated as at 42 such that the support surface 29 within the interior crate 31 is not heated.

The nursery crates 25 are of a similar construction, however do not have an interior crate such as 31 and a central pig support surface 29a of the nursery crates 25 is provided with a more compact and effective heating conduit arrangement to heat the entire central surface 29a.

A section 38, 38a of these pig walkways or support surfaces 29, 29a are shown in FIGS. 4 and 5. FIG. 4 shows the farrowing support surface section 38 having a heating conduit pipe 40 running therethrough such that the conduit 40 has one end 44 exposed within a cutout 46 in an end wall 48 of the support section 38, the conduit projecting into the support section 38 perpendicular to a face 49 of the end wall 48 then making a 90° curve at 50 to proceed parallel to the face 49 of the end wall 48 transversely nearly the width of the walkway section 38 and making another 90° turn away from the face 49 of the end wall 48 as at 52. At this point the conduit 40 is nearly directly under the portion of the crate 23 which will contain the interior crate 31 where the sow is located during farrowing and this portion of the support section 38 is not desired to be heated. Therefore, an insulating material 54 is provided around the conduit 40 to prevent it from heating this area of the pig walkway section or support surface 38. After the conduit 40 exits this area it makes two more 90° turns at 56 and 58 and exists in the cut-out 46 in an opposite end wall 60 substantially colinear with the entrance end 44 of the conduit 40 at the opposite end 48 of the support section 38.

FIG. 5 shows a section 38a of the pig walkway row 29a of the nursery which contains therein a heating conduit 40a which is shown to have several more bends than conduit 40 in the farrowing support section 38 to provide a more effective and total heating surface without the need for any insulated sections. The conduit 40a enters at an end 48a of the walkway section 38a and exits at an opposite end 60a substantially colinear with the entrance. The bends and spacing shown is merely illustrative and any number of configurations may work equally well within the scope of my present invention.

Below the slotted or screened coverings 36, 34 are provided the wide gutters 28b and narrow gutters 28a, respectively, as best seen in FIG. 6. A rear end 64 of the farrowing crates 23 is provided with the wide gutter 28b formed in substantially a Y-shape and having a U-shaped trough 65 forming the bottom leg thereof. A front end 67 of the crate 23 is provided with the narrow gutter 28a.

The present invention contemplates that the two widths of gutters 28a and 28b as well as the walkways 27 and support surfaces 38 and 38a will be precast in concrete in sections or modules approximately 5 feet long which can be stockpiled and furnished on demand to be transported to the desired location of the swine building for final assembly.

As seen in FIG. 7, gutter sections 66 are abutted end to end to form the waste gutter row 28b. Also the support surface sections 38 are abutted end to end to form the support surface row 29 and are supported above and between the gutter row 28b by upright walls 68 of the gutter sections 66.

FIG. 8 shows a partial view of two adjacent gutter sections 66 which have been abutted. Each end of the gutter section 66 has formed therein a notch 69 such that when two ends of adjacent gutter sections 66 are abutted, a channel 70 is formed. It is desired to seal and retain the gutter sections 66 in a water-tight row and to accomplish this an adhesive sealant material 72 is applied to the channel 70 such that it fills the channel 70 and is flush with an adjacent interior wall 74 of the gutter sections 66.

As seen in FIG. 9, the walkway sections 38 are abutted in a similar manner with the addition of a tubular coupling member 76 sealing the ends 44 of two adjacent heating conduits 40 in a communicating manner. The cut-out 46 is then filled with a mortar material to provide for a smooth walk surface.

FIG. 10 shows a cross sectional view of a gutter section or module 66 being precast in a mold or form 80. The mold or form 80 is constructed in a manner whereby the gutter section 66 is cast in an inverted position.

Although only the wide gutter 62 is shown in the mold 80, the narrow gutters 64 and the walkway area sections 27 and support surface sections 38 and 38a are formed in a similar inverted manner.

The form or mold 80 is comprised of a one-piece interior wall member 82 to be made of sheet-form steel or other smooth, rigid material. At its opposite ends the sheet-form wall member 82 has a flange 82a adapted to be horizontally disposed and adapted to be engaged against an adjacent wall 86a of an exterior mold member 86. The wall member 82 is essentially Y-shaped, having two inwardly inclined legs 82b, 82b terminating in a central vertically disposed portion which includes a pair of spaced parallel vertically disposed legs 82c, 82c joined by a smoothly curved bight portion 82d.

The one-piece interior wall 82 forms the interior side walls 74 of the gutter section 66 and also the U-shaped trough 65. The exterior wall 86 of the mold 80 is shaped to form the exterior walls 88 of the gutter section 66 and can be constructed of wood or other standard form construction material. A brace 90 is used to retain the form walls 82, 86 in spaced relationship. Lifting pins 92 are molded into what will be the top walls 94 of the gutter section 66 in a recessed manner.

More specifically the exterior mold wall member 86 herein shown as made of metal, has two complementary parts right and left, namely, an upwardly extending leg 86b apertured at the top to receive a clamping bolt 90a of the brace 90 and spaced from one another by a spacing sleeve 90b. The bolt 90a has a head 90c at one end and accepts a threaded nut 90d at the opposite end, thereby to lock the mold 80 at the top.

The exterior wall member 86 has a first wall portion 86c which extends downwardly and somewhat outwardly, using the orientation of FIG. 10. A second portion 86d extends downwardly and outwardly and terminates in a short vertical leg portion 86e. Extending inwardly at right angles to the leg portion 86e is a bottom wall 86a flanged as at 86f and apertured to receive a headed clamping bolt 86g accepting a nut 86h to lock the mold parts together at the bottom.

FIG. 11 shows in greater detail the lifting pin 92 located within the gutter section 66 and being recessed below the top wall 94 thereof. An access depression 96 is provided during the molding process to facilitate the handling of the gutter section 66 by means of the lifting pins 92.

Although not shown in the drawings, lifting pins 92 are also provided in the bottom of the gutter sections 66 and in both sides of the walkway section 27 and support surface sections 38 and 38a to facilitate handling.

Referring back to FIG. 10, after the mold assembly 80 and reinforcing bars (not shown) are placed therein, a mass of plastic concrete material 97 is poured therein between the exterior wall 86 and the interior wall 82 to a desired level. As the plastic concrete material 97 settles due to gravity and coalesces, it presses firmly against the interior wall 82 filling any voids or gaps between the plastic concrete material 97 and the wall 82 formed during the pouring process. Because of the smooth nature of the surface of the interior wall 82, the interior side wall 74 of the gutter section 66 turns out to be essentially free from surface imperfections and of a uniform smoothness.

FIG. 12 shows a side cross-sectional view of the support surface section 38 having the heating conduit 40 therein. The bottom wall 98 of the support section 38 is flat and is to be placed adjacent both ends of the support section 38 on the top walls 94 of adjacent gutter sections 66. A top surface 99 of the support section 38 is comprised of a central flat area 100 located between two uniformly sloping areas 102 both sloping away from the flat area 100 which each have a notched portion 104 formed on an opposite end from the flat area 100 and which extend the entire length of the support section 38. As best seen in FIG. 6, the support sections 38 are placed on the top walls 94 of adjacent gutter section 66 and the notched portions 104 are formed to receive the screened or slotted coverings 34, 36 therein.

FIG. 13 shows the gutter section row 28b which is comprised of several gutter sections abutted end to end and having at one end thereof a cap 108 sealed at 110 in a fluid impermeable manner and at an opposite end thereof a drain assembly 112 comprising an end piece 114 having a drain hole 116 formed therein and being fluid impermeably sealed to the gutter section row 28b as at 118.

As seen in FIG. 7, the drain holes 116 are connected to the vertical drain pipes 30a and 30b which in turn are connected to the horizontal collection drainage pipe 30c.

FIG. 14 shows the drain assembly 112 in operation wherein the vertical pipe 30a which is received in the drain hole 116, in turn receives a stand pipe 124 which is of a height sufficient to allow waste to accumulate to a predetermined height but which is also open at the top at 126 to provide for drainage of the gutters if the wastes accumulate beyond a certain second predetermined height. A handle 128 is provided to remove the stand pipe 124 from the vertical drain pipe 30a to allow the wastes to drain from the gutter row 28a. A removable walkway section 130 is provided over the drain area.

As seen in FIG. 1, the waste collection system 30 is comprised of vertical drains 30a, 30b which collect into the horizontal drainage pipe 30c which is connected to a waste storage receptacle 132 for further processing.

In accordance with the principles of the present invention, and referring to FIGS. 1 and 6, in constructing the gutter system of the present invention, the area within the exterior foundation walls 21 of the swine building 20 is excavated to a depth sufficient to allow the top walls 94 of the gutter sections to be slightly below floor level. The drainage pipes 30a, 30b and 30c are laid in place and then a plurality of concrete footings 142 are poured between two opposite foundation walls in the excavated area. These footings are to carry the gutter section rows 28a and 28b and can be slightly sloped toward the drainage end of the gutter rows 28a and 28b. The vertical drain pipes 30a and 30b will protrude slightly above the footings to be received in the drain hole 116 of the drain assembly 112.

After the footings have set, the preformed gutter sections 66 are set onto the footings 142 and abutted end to end to form gutter section rows 28a and 28b. An adhesive sealant 72 is applied in the channel 70 formed between the abutted gutter sections 66. The drain hole 116 of the drain assembly 112 is placed over the vertical drain pipes 30a, 30b located in the footings 142 at the end of the row.

Next the preformed floor sections 27, 38, 38a are placed on the top walls 94 of adjacent gutter rows 28a, 28b being abutted end to end to form walkways 27, 29, 29a between the gutter section rows 28a, 28b. If the floor sections are of the heated type, the coupling member 76 is permanently attached to both ends 44 of the heating conduit 40 which are abutted and the cutout area 46 surrounding the coupling is filled with motar.

Thus, as seen in FIG. 6, the gutter sections 66 are load bearing members and do not require back-fill into the open areas between the gutter section rows 28a, 28b. This permits access to the area below the walkways 27, 29, 29a for storge or service.

The gutter section rows 28a, 28b will flush automatically upon removal of the stand pipe 124 if the gutter row 28a, 28b is 50 feet or less in length. If it is desired to have gutter section rows 28a, 28b in excess of 50 feet, the gutter sections 66 can be sloped toward both ends of the gutter section row 28a, 28b and drainage provided at each end, or can be sloped toward the middle which would provide for a central drainage point for each row.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. In a system of flush gutters for a swine building having an outer foundation wall, the combination comprising:
    a plurality of concrete footings traversing said building forming rows between two opposite foundation walls and being sloped toward at least one side of said building,
    said footings having a top surface below floor level in said building,
    a plurality of precast concrete gutter sections,
        each of said secions comprising two longitudinal outwardly sloping side walls having two top walls spaced laterally apart and forming a trough therebetween,
        said outwardly sloping walls having an inner surface forming said trough which is essentially free from surface roughness and is of a uniform smoothness,
    said sections being abutted end to end forming rows and having a bottom surface resting on said top surface of said footings such that a top wall of said sections is slightly below floor level in said building,
    a low end of said gutter section row having a selectively operable drain therein,
    a plurality of precast concrete walkway sections abutted end to end and attached to said top walls of two gutter sections of adjacent gutter section rows,
    said walkway sections having a top surface disposed at floor level in said building, whereby waste material from swine in said swine building will fall into said gutters and will accumulate until said drain is opened causing said waste material to automatically flush from said gutter section rows.

2. The system of claim 1, wherein said gutter section rows are free standing, load bearing members requiring no backfill or other support.

3. The system of claim 1, wherein said concrete footings are sloped toward only one side of said building and only one end of each gutter section row being at the lower end of said sloped footing and having a drain attached thereto with the opposite end of said gutter section row being at a higher end of said sloped footing and having a fluid impermeable cap thereon.

4. The system of claim 1, wherein said walkway sections have carried therein tubing for a heated liquid to be pumped therethrough resulting in said concrete walkway having a warm top surface.

5. The system of claim 4, wherein said tubing is insulated in predetermined locations to provide for heated and non-heated areas on said top surface of said walkway.

6. The system of claim 1, wherein said walkway sections have a top surface which is essentially free from surface roughness and is of a uniform smoothness.

7. In a system of flush gutters for a swine building having an outer foundation wall, the combination comprising:
- a plurality of concrete footings traversing said building forming rows and being sloped toward at least one side of said building,
- a plurality of precast concrete gutter sections,
  - each of said sections comprising two longitudinal outwardly sloping side walls having two top walls spaced laterally apart and forming a trough therebetween,
  - said outwardly sloping walls having an inner surface forming said trough which is essentially free from surface roughness and is of a uniform smoothness,
- said sections being abutted end to end forming rows and having a bottom surface resting on the top surface of said footings,
- a low end of said gutter section row having a selectively operable drain therein,
- a plurality of precast concrete walkway sections abutted end to end and attached to said top walls of two gutter sections of adjacent gutter section rows, whereby waste material from swine in said swine building will fall into said gutters and will accumulate until said drain is opened causing said waste material to automatically flush from said gutter section rows.

* * * * *